3,369,412
VARIABLE SPEED TRANSMISSION
Douglas F. McFarland and David Lee McFarland, both of Davis City, Iowa 50065
Filed Aug. 30, 1965, Ser. No. 483,748
10 Claims. (Cl. 74—60)

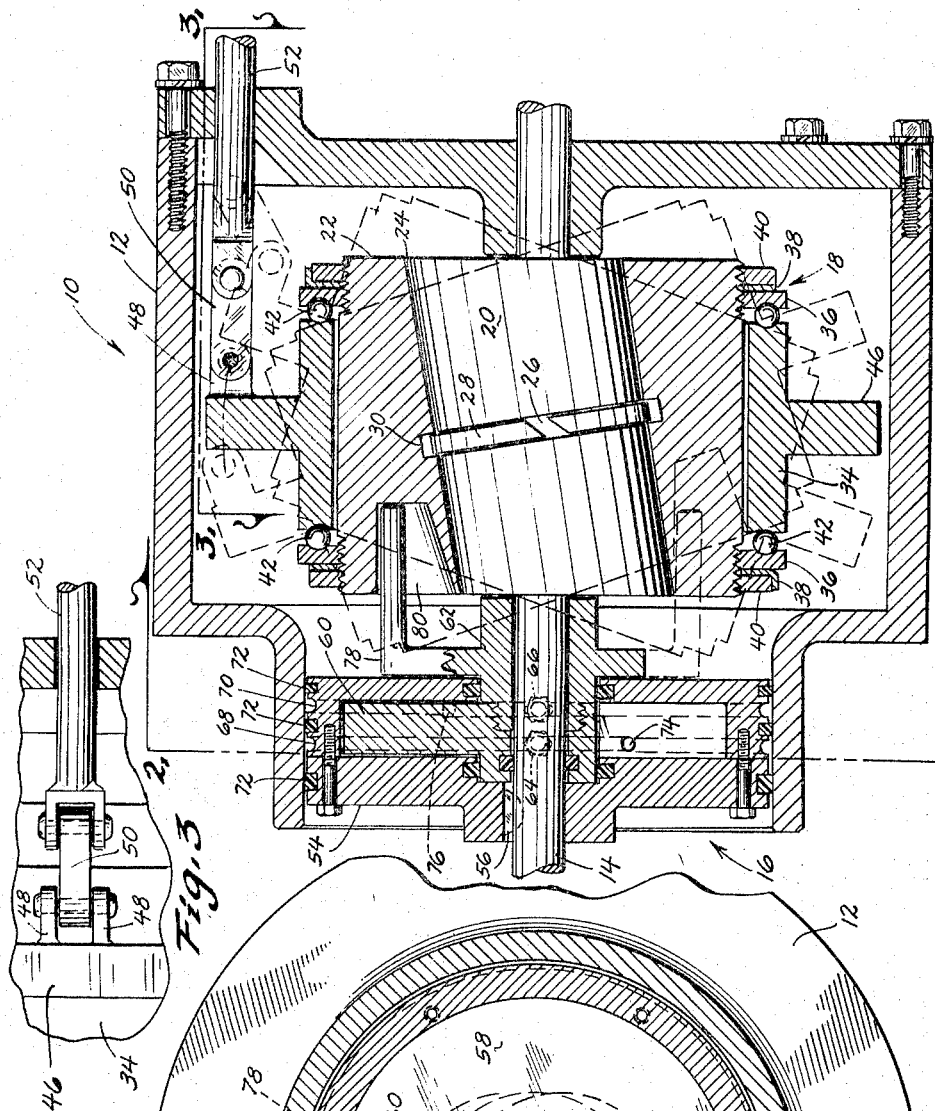

ABSTRACT OF THE DISCLOSURE

A swash plate assembly having an elongated shaft, a cylindrical member mounted on the shaft at an angle to the longitudinal axis of the shaft, a second cylindrical member having an opening therethrough and said first cylindrical member mounted in said opening, said first cylindrical member and the opening of the said second cylindrical member having a common longitudinal axis, control means for selectively interconnecting and rotating said first and second cylindrical members relative to each other wherein the outer peripheral surface of the second cylindrical member has a uniform radius of curvature about its center longitudinal axis at times and at other times has a radius of curvature which varies along the length of the outer surface of the second cylindrical member whereby in the latter positions points on the outer surface of the second member move back and forth along the longitudinal axis of the shaft as the shaft is rotated.

---

It is one of the principal objects of this invention to provide a variable speed transmission which will vary by degree the output power relative to the input power at any time during its operation whereby the output power may be equal to substantially the input power or gradually reduced to zero output.

Another object of this invention is to provide a variable speed transmission having a pair of rotatable cylindrical members rotatable relative to each other wherein the inner member is integrally connected to an input power shaft and disposed with its longitudinal axis extending at an angle to the longitudinal axis of the input power shaft and similarly, the inner cylindrical member is disposed with its center longitudinal axis at an angle to the center longitudinal axis of the outer cylindrical member whereby upon selective adjustment of the two rotatable members relative to each other the outer surface of the outer cylindrical member will wobble back and forth along the longitudinal axis of the input shaft. By further adjustment of the two rotatable cylindrical members they will turn in a true circle and thus produce no output power as the amount of offset of one member relative to its center longitudinal axis is counterbalanced by the amount of offset of the corresponding portion of the other cylindrical member from its center longitudinal axis.

A still further object of this invention is to provide a stationary collar member for embracing the outer cylindrical member wherein the collar member is secured to an output reciprocating power rod.

A still further object of this invention is to provide a variable speed transmission having an actuating means which includes a pair of control members, one movable within the other by hydraulic fluid pressures acting on one of the control members which in turn is coupled to one of the cylindrical rotating members.

A still further object of this invention is to provide a variable speed transmission having an actuating means which includes a pair of control members, one rotatable within the other, wherein both of the control members rotate as a unit but are selectively adjustable by hydraulic fluid pressures which may be selectively introduced to either side of the one control member within the other control member.

A still further object of this invention is to provide a variable speed transmission having a pair of rotatable members, one of which is rotatable within the other and an actuating means for rotating the members relative to each other wherein the actuating means includes a finger movable in a diametrically located groove in the other member whereby rotational and wobble movement of the cylindrical members may be effected.

A further object of this invention is to provide a variable speed transmission which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a cross-sectional view of the variable speed transmission of this invention;

FIG. 2 is a cross-sectional view taken along line 2—2 in FIG. 1; and

FIG. 3 is a fragmentary top plan view of the output rod member and its linkage connection to the collar member embracing the pair of rotatable cylindrical members.

The variable speed transmission of this invention is referred to generally in FIG. 1 by the reference numeral 10, and includes an outer housing 12 through which a drive shaft 14 extends. A control unit 16 is positioned in one end of the housing 12 and a variable speed output assembly 18 in the other end of the housing 12.

As seen in FIG. 1, a first cylindrical member 20 is integrally mounted on the input drive shaft 14 and is disposed with its center longitudinal axis extending at an angle to the longitudinal axis of the drive shaft 14. Matingly embracing the inner cylindrical member 20 is an outer cylindrical member 22 which has a cylindrical opening 24 extending therethrough with its longitudinal axis extending at an angle to the center longitudinal axis of the cylindrical member 22. An annular recess 26 is formed centrally in the inner cylindrical member 20 to receive a snap lock ring 28 which is also received in an annular recess 30 formed in the inner wall of the cylindrical member 22 and thereby limits relative longitudinal movement between the two cylindrical members 20 and 22. Rotational movement of these members 20 and 22 is however permitted.

A collar member 34 is stationary within the casing 12 and embraces the outer cylindrical member 22 whereby the two cylindrical members 20 and 22 rotate therein on the shaft 14. Each end of the outer cylindrical member 22 is threaded to receive a bearing plate 36, a lock washer 38 and a nut 40. A plurality of ball bearings 42 are disposed in hemispherical recesses formed in facing faces on the bearing plates 36 and the outer annular edges of the collar member 34. Accordingly, the collar member 34 is limited against relative longitudinal movement on the cylindrical members 20 and 22 and accordingly the shaft 14 although rotational movement of the cylindrical members 20 and 22 is permitted relative to the collar member 34.

An annular shoulder 46 is integrally formed on the exterior of the collar member 34 intermediate its longitudinal length and is provided with at least one pair of ears 48 which are connected to a link element 50 in turn connected to a power output slidable rod 52 which extends through the housing 12 end wall.

The control unit 16 includes a first member 54 which is locked to the shaft 14 by a key 56. The member 54 has an annular chamber 58 formed therein to receive a second control member 60 which is threadably connected to a collar member 62 disposed between the control member 54 and the cylindrical members 20 and 22 as best seen in FIG. 1. A pair of hydraulic lines 64 and 66 are connected to the housing 12 and are in communication with annular grooves 68 and 70 respectively formed in the outer peripheral surface of the control member 54. Annular seal elements 72 are disposed on each side of the annular grooves 68 and 70. A pair of passageways 74 and 76 extend from the annular grooves 68 and 70 respectively to opposite sides of the chamber 58 and thereby are capable of varying the pressure on the inner control member 60 to move it to the desired position within the chamber 58. As seen in FIG. 2, the inner control member 60 is moved to its extreme position and is capable of being rotated 180 degrees within the chamber 58.

A finger member 78 is integrally connected to the collar member 62 and is received in a cavity 80 formed in the side of the outer cylindrical member 22 as seen in FIG. 1.

Thus, in operation is is seen that as the cylindrical members are illustrated by the solid lines in FIG. 1 there would be no movement of the rod 52 since the outer peripheral surface of the outer cylindrical member 22 and accordingly the collar 34 have an equal radius of curvature relative to the longitudinal axis of the input shaft 14. Accordingly, the shaft 14 would rotate the control member 54 which in turn through the inner control member 60 would cause the collar member 62 with the fingers 60 to rotate the outer cylindrical member 22 as the inner cylindrical member 20 is being rotated by its direct connection to the shaft 14. When output power is desired, the hydraulic control system is actuated and fluid would be introduced into the chamber 58 through the conduit 76 causing the inner control member 60 to rotate clockwise as viewed in FIG. 2 thereby rotating the outer cylindrical member 22 relative to the inner member 20 and if it is rotated to its extreme position of 180 degrees within the chamber 58, the unit 18 will move between the dash line positions shown in FIG. 1 as the shaft 14 is rotated. Consequently the output rod 52 will be reciprocated between the dash line positions illustrated. Any desired variation may be obtained by moving the inner control member 60 back towards its solid line neutral position of FIG. 2. It is to be appreciated that any number of output rods 52 may be connected by a similar linkage 50 to the annular rim 46 since it is not rotated but merely pivots or wobbles back and forth relative to the longitudinal axis of the center drive shaft 14. The cavity 80 in the outer cylindrical member 22 is formed with sufficient space diametrically to accommodate the finger 60 as the outer cylindrical member 22 moves between its extreme dash line positions of FIG. 1.

Some changes may be made in the construction and arrangement of our variable speed transmission without departing from the real spirit and purpose of our invention, and it is our intention to cover by our claims, any modified forms of structure or use of mechanical equivalents which may be reasonably included within their scope.

We claim:

1. A variable speed transmission, comprising, a rotatable shaft,
    an elongated cylindrical member mounted on said shaft and having a longitudinal center axis extending at an angle to the center longitudinal axis of said shaft,
    a second elongated cylindrical member rotatably mounted on said first cylindrical member, said second cylindrical member having an opening for matingly receiving said first cylindrical member, said opening having a center longitudinal axis disposed at an angle to the center longitudinal axis of said second member and is common to the longitudinal center axle of said first cylindrical member,
    control means for interconnecting and selectively rotating said first and second cylindrical members relative to each other to one position of adjustment wherein the outer peripheral surface of said second cylindrical member has a uniform radius of curvature about the center longitudinal axis of said shaft and to other positions wherein said radius of curvature varies along the length of said outer surface of said second member whereby in said latter positions points on the outer surface of said second member move back and forth along the longitudinal axis of said shaft as said shaft is rotated,
    output drive means coupled to said second member.

2. The structure of claim 1 wherein said output drive means includes a rod adapted to reciprocate as said shaft is rotated.

3. The structure of claim 1 wherein said output drive means is connected to said second member through a collar member, said collar member being mounted on said second member, said drive means limiting rotation of said collar member relative to the longitudinal axis of said shaft.

4. The structure of claim 1 and a housing is provided for enclosing said first and second members and said shaft, a collar member embraces said second member, said output drive means includes a rod slidably engaging said housing and is pivotally connected to said collar member, said rod limits said collar against rotational movement about said shaft.

5. The structure of claim 1 and means for limiting relative longitudinal movement between said first and second members.

6. The structure of claim 3 wherein said collar member is further defined as having an ear intermediate the ends of said collar for connecting said power means to said collar.

7. The structure of claim 1 wherein said control means includes a pair of hydraulically interconnected members rotatably mounted on said shaft, one of said control members being locked to said shaft and the other control member being in engagement with one of said cylindrical members, the other of said cylindrical members being locked to said shaft, and hydraulic means for actuating said control members and thereby selectively rotate said cylindrical members as said shaft is rotating.

8. The structure of claim 7 wherein said other control member is connected to said one cylindrical member by a finger element received in a cavity formed in said one cylindrical member.

9. The structure of claim 7 wherein said first cylindrical member is locked to said shaft and said second cylindrical member is in engagement with said finger element.

10. The structure of claim 7 wherein said other control member has an annular chamber formed therein for rotatably receiving said one control member, said annular chamber having a length sufficient for said one control member to rotate approximately 180 degrees, and hydraulic fluid conduits being in communication with said chamber on opposite sides of said first control member whereby said first control member may be rotated back and forth under pressure of said hydraulic fluid.

References Cited

UNITED STATES PATENTS 2,256,079   9/1941   Dinzl _____ 74—60
3,181,475   5/1965   Thompson _____ 74—60

FRED C. MATTERN, Jr., *Primary Examiner.*

C. J. HUSAR, *Assistant Examiner.*